United States Patent
Polish et al.

(10) Patent No.: US 12,107,846 B2
(45) Date of Patent: Oct. 1, 2024

(54) SIGN-UP AND LOGIN INTERFACE USING A MESSAGING SYSTEM

(71) Applicant: Stretch Industries LLC, New York, NY (US)

(72) Inventors: Beth Polish, New York, NY (US); Nathaniel Polish, New York, NY (US); Seth Godin, Hastings on Hudson, NY (US); Robert Gehorsam, New York, NY (US)

(73) Assignee: Stretch Industries LLC, New York, NY (US)

( * ) Notice: Subject to any disclaimer, the term of this patent is extended or adjusted under 35 U.S.C. 154(b) by 246 days.

(21) Appl. No.: 17/372,187

(22) Filed: Jul. 9, 2021

(65) Prior Publication Data

US 2022/0014510 A1    Jan. 13, 2022

Related U.S. Application Data

(60) Provisional application No. 63/050,486, filed on Jul. 10, 2020.

(51) Int. Cl.
*H04L 9/40* (2022.01)
*G06N 5/04* (2023.01)
*H04L 51/046* (2022.01)

(52) U.S. Cl.
CPC ............. *H04L 63/083* (2013.01); *G06N 5/04* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 6,608,636 | B1 | 8/2003 | Roseman |
| 9,288,166 | B2 | 3/2016 | Scherpa et al. |
| 10,229,164 | B1 | 3/2019 | Hampson et al. |
| 2011/0107236 | A1 | 5/2011 | Sambhar |

(Continued)

FOREIGN PATENT DOCUMENTS

| | | |
|---|---|---|
| CN | 107276885 A | 10/2017 |
| WO | 2019227062 A1 | 11/2019 |

OTHER PUBLICATIONS

PCT International Search Report and Written Opinion; Application No. PCT/US2021/041344, mailed Oct. 26, 2021, 16 pgs.

(Continued)

*Primary Examiner* — Brandon Hoffman
(74) *Attorney, Agent, or Firm* — Patent Law Works LLP

(57) ABSTRACT

A system and method for improving login processes with a unique login-interface system is disclosed. The unique login-interface system allows users to subscribe, join, or sign-up for an automatic login interface that does not require explicit registration other than inclusion in a messaging system. The messaging system may be any number of systems such as email, text messaging, phone calls, or any other messaging system in which there is a user identification or alias associated with a user. The user identification may be of any type that is presented or recognized in a computing world. The unique login-interface system includes an identity-provider application with a collision-resolution engine to ensure unique user identity credentials and an inference engine to identity multiple participant entries for a single user.

20 Claims, 8 Drawing Sheets

(56) References Cited

U.S. PATENT DOCUMENTS

| | | |
|---|---|---|
| 2012/0198012 A1* | 8/2012 | Odell .................. H04L 51/04 709/206 |
| 2013/0086670 A1* | 4/2013 | Vangpat ............ H04L 63/0815 726/8 |
| 2013/0096981 A1 | 4/2013 | Evans et al. |
| 2013/0297513 A1 | 11/2013 | Kirillin et al. |
| 2014/0164511 A1 | 6/2014 | Williams et al. |
| 2015/0127628 A1 | 5/2015 | Rathod |
| 2018/0046957 A1 | 2/2018 | Yaari |
| 2018/0060883 A1 | 3/2018 | Cheesman et al. |
| 2018/0191851 A1 | 7/2018 | Baughman et al. |
| 2018/0279063 A1 | 9/2018 | Sun et al. |
| 2018/0295077 A1 | 10/2018 | Scherpa et al. |
| 2018/0351756 A1 | 12/2018 | Dave et al. |
| 2020/0258104 A1 | 8/2020 | Li |
| 2021/0065223 A1 | 3/2021 | Blecha-Ward et al. |
| 2021/0304450 A1 | 9/2021 | Smith et al. |
| 2021/0306387 A1 | 9/2021 | Smith et al. |
| 2021/0399911 A1 | 12/2021 | Jorasch et al. |
| 2021/0400142 A1 | 12/2021 | Jorasch et al. |
| 2022/0138775 A1 | 5/2022 | Mamdur et al. |

OTHER PUBLICATIONS

International Search Report and Written Opinion for International Application No. PCT/US2021/041145, mailed Oct. 13, 2021, 15 pgs.

EPO Communication Extended European Search Report, Appln No. 21838166.3 Stretch Industries LLC, dated Jun. 24, 2024, 13 pgs.

EPO Communication Extended European Search Report, Appln No. 21836826.4 Stretch Meetings, Inc., dated Jun. 24, 2024, 7 pgs.

Nijssen, Peter, Social Network Authentication: Merging Accounts. SitePoint. Https://www.peternijssen.nl/author/peter/, Jul. 14, 2014, 13 pgs.

* cited by examiner

SIGN-UP AND LOGIN INTERFACE USING A MESSAGING SYSTEM

RELATED APPLICATION

This application claims the benefit of Provisional Application No. 63/050,486 filed on Jul. 10, 2020, which is incorporated herein by reference.

BACKGROUND

1. Field of the Invention

The present invention relates generally to the field of improving user experience in communication and computing systems, for example, in and across software applications and related scenarios that require user verification via a login interface before granting access. Such software applications include, but are not limited to, any system, platform, or service requiring an initial sign-in or login, for access to cloud-based or enterprise platforms, including video-conferencing, tele-conferencing, and/or in-person events or meetings, streaming services, email systems, messaging systems, retail applications, or the like. The present invention is directed specifically to a system configured for an easy invitation and registration process that serves to sign up users into any program or application and an automated login interface for users who subscribe for the easy registration process.

2. Description of the Related Art

In the computing field, many scenarios, organizations, and services present a sign-in or login interface (e.g., by a "login" tab or link) to a user to complete during a sign-in or login process. Many organizations, such as businesses or other enterprises, provide their employees or other members with access to a variety of software applications, such as e-mail applications, chat applications, payroll applications, timekeeping applications, and the like. For security reasons, these organizations typically impose a sign-in or login operation as a prerequisite for use of the applications. Thus, a user could potentially have a different set of sign-in credentials (e.g., username and password) for every different application to which he or she has access. In fact, many users consider it best practice to have different sign-in credentials for each application so that if one is compromised the others remain secure. Yet, the necessity of separately signing in to each application (i.e., providing the user's credentials for that application) imposes considerable burden on users, who must remember and then enter the credentials for every application used. Furthermore, in instances when users forget their credentials, the organization's information technology departments must routinely respond to user inquiries about forgotten credentials, wasting time and resources dedicated to this process. These responses are often opportunities for social engineering hacks and other security compromises.

The sign-in or login process is typically used to grant access to platforms, systems, websites, or software applications, for example, to enter a specific page, website or application, which other unauthorized users cannot see or use. Once a particular user is logged in, a login identity for a particular user, including but not limited to, a username, token, or the like, may be used to track what actions the particular user has taken while connected to one or more websites of any particular online service, program, or application. Typically, a logging out operation from any particular online service, program, or application is required and may be performed explicitly by the user after taking one or more actions, such as entering an appropriate command or clicking a website link labeled to "log out." In some scenarios, it can also be done implicitly, such as by the particular user powering off his or her workstation, closing a web browser, moving on to a different website, or not refreshing a website within some defined period.

There are many different methods of logging in, that may be via image, fingerprints, eye scan, password (e.g., by oral or textual input), or the like. Typically, for the log in operation, a device or system may present a textbox pair to receive a username and a password, or a numeric keypad to enter a numeric password. The device may compare the text entry to authentication credentials stored in a particular user's profile maintained on the application or service platform and in the event of a match may admit the user to the computing environment to which the user seeks access.

The problem is how to sign users up for a service, software application, or platform, without an explicit login process. Sign up processes are time consuming. In many instances, users find them cumbersome and invariably frustrating leading to many failed attempts and locked-up accounts in fear of possible fraud. Potential users drop off. People will sometimes join multiple times by accident or on purpose. Peoples' communications credentials (e.g., email address) will sometimes change over time and their registration will not track them through changes.

Many scenarios involve the configuration of a device to support variations in the computing environment to suit the interests of the user. For example, the user may provide login information in different contexts or applications. Consider one application relating to a meeting, conference, or such event, which routinely requires an established login process. Meetings are often managed as single isolated events with two or more participants, even if they are in fact recurring meetings. In such meeting scenarios, meeting participants or attendees may log into video meetings both via their phone and via their computer. For video meetings, some participants use one device for both the video and audio elements of the meeting. This device typically has a camera so other participants can see them and a microphone so they can hear the conversation in the meeting and enable them to speak and be heard. In some scenarios, meeting participants use two different devices. For example, they use their computer for the camera, to view other participants and materials that may be shared in the meeting or use other video meeting functionality such as chat, voting, reactions. They also log into the meeting with their phone as their preferred method for hearing the meeting and for speaking. If a participant logs into a virtual meeting with two separate devices, the system executing the virtual meeting shows the two devices as two separate participants, rather than linking the two as one to show a single participant presence instead of taking up the space of two participants.

Virtual meeting software systems typically provide their participants with a participant identification ("participant ID") that allows them when they login to any system to connect their computer login with their phone login as a way to solve the problem of two independent logins for an individual participant. This approach has inherent limitations because the use by participants can be inconsistent and misleading. In instances when this approach is not used by a meeting participant and in the event a meeting host on his or her own is able to recognize an unidentified phone number (via the "participant ID") as belonging to an individual who has separately logged in with his or her computer, then the meeting host may in some instances be able to merge the two separate logins by the same participant. This approach again has inherent limitations and imposes greater burden on the meeting host. For example, in some instances the meeting host may not be familiar with how to use a technical merging feature. In yet other instances the meeting host may not know the name of the person who has logged in on an unidentified phone number. In large meeting scenarios, this poses a bigger problem. In all cases, a solution to this approach must depend on the actions that meeting participants must take, which are inconsistently applied. In some scenarios, some participants may be merged and others not in the same video meeting. In a video-conferencing system this problem might manifest as a user who is in fact a registered user appearing in the meeting as identified only as or by a phone number. This would typically occur because the registered user is entering the system via a different entry point than usual. This causes confusion and making tracking the user's participation more difficult. Merging is also an opportunity for security compromise since a hacker can seek to merge her account with an otherwise privileged user and thus gain access to their resources.

Therefore, there are many drawbacks that currently exist, which continue to present complexities in a process that is essential to participation in any computing environment. With each passing day, there is a greater need to use more systems in everyday lives, and memorizing the complex passwords for each of those systems is a challenge many users face every day.

SUMMARY

The present invention is directed to simplifying the registration process to any online computing environment. Users are able to access different applications and services without keeping track of their sign-in credentials or identity. Systems, organizations or individuals using the present invention may easily add and delete users as needed.

The present invention creates a unique login interface to enhance the user experience. Users may sign up or subscribe to use the login-interface system in accordance with the present invention. The login-interface system includes an identity-provider program or service that may be easily integrated with any applications used by an organization, whether an internal application within the organization or a third-party application.

Users may use the unique login-interface system or process with no other registration required besides inclusion in any messaging system. The messaging system may be any number of systems such as email, text messaging, phone calls, or any other in which there is a user identification ("USERID") associated with a user. The user identification may be of any type that used in a computing world.

The login-interface system using a messaging system and method (hereinafter, referred to as the "Service") offers an efficient and effective solution. The login-interface system creates a list of real human users or people who want to become users. This list is stored in a first database and incudes user names. For example, these may be referred to as USER1, USER2, USERN etc. These users are identified to the system by their real user names or references, for example, John Doe, Jane Smith etc. The list of real users represents users who may or may not have already joined the login-interface system. The login-interface system is dynamic and is continuously updated. The login-interface system may be used in any of a very wide variety of services such as a rating service, a news services, or the like, with relative ease.

The login-interface system includes a registration database, which represents users who are registered with the login-interface system and are active users. Each entry contains a ServiceUsern where n represents the user number. Each entry also includes the USERSERVICEID for the user within the login-interface system. Also, all of the USERIDs used by that user in any messaging systems that the user communicates with are stored. Finally, the login-interface system collects a set of information on each service user that is the set of all things and information that the login-interface system knows about that user, such as the IP address, age, time of day that the user uses the login-interface system etc. This set of other information is used by the resolution process performed by the login-interface system to attempt to identify an unknown user.

The login-interface system further includes and maintains a database that lists each known user and each messaging system identification (ID) that the user has used. Every time that the login-interface system receives a message, the USERIDs used are either matched within the database or they are added to the database to form a potential new user.

The login-interface system has an identity-provider application including an inference engine and a collision-resolution engine that resolve user identification conflicts by periodically running a resolution process. The login-interface system is adaptive and automatically tracks and adds users to applications, services, or systems, as needed, without requiring users to sign in or undertake a registration process themselves. Any potential new users are simply identified to the login-interface system at some point with use of messaging systems, after which the login-interface system identifies each user and signs them in as needed. Further, if an existing user of record with the Service is using a new email address or phone number, the Service automatically recognizes this scenario and registers the "USERID" in the user's records without requiring the user to go to a webpage or other management interface to change or update the information. Advantageously, any information that is discovered while tracking is used to add a new "USERID" with an existing account. In some embodiments, the Service creates a temporary new or provisional "ServiceID" until existing users confirm that the new "ServiceID" corresponds to their existing and current "ServiceID."

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
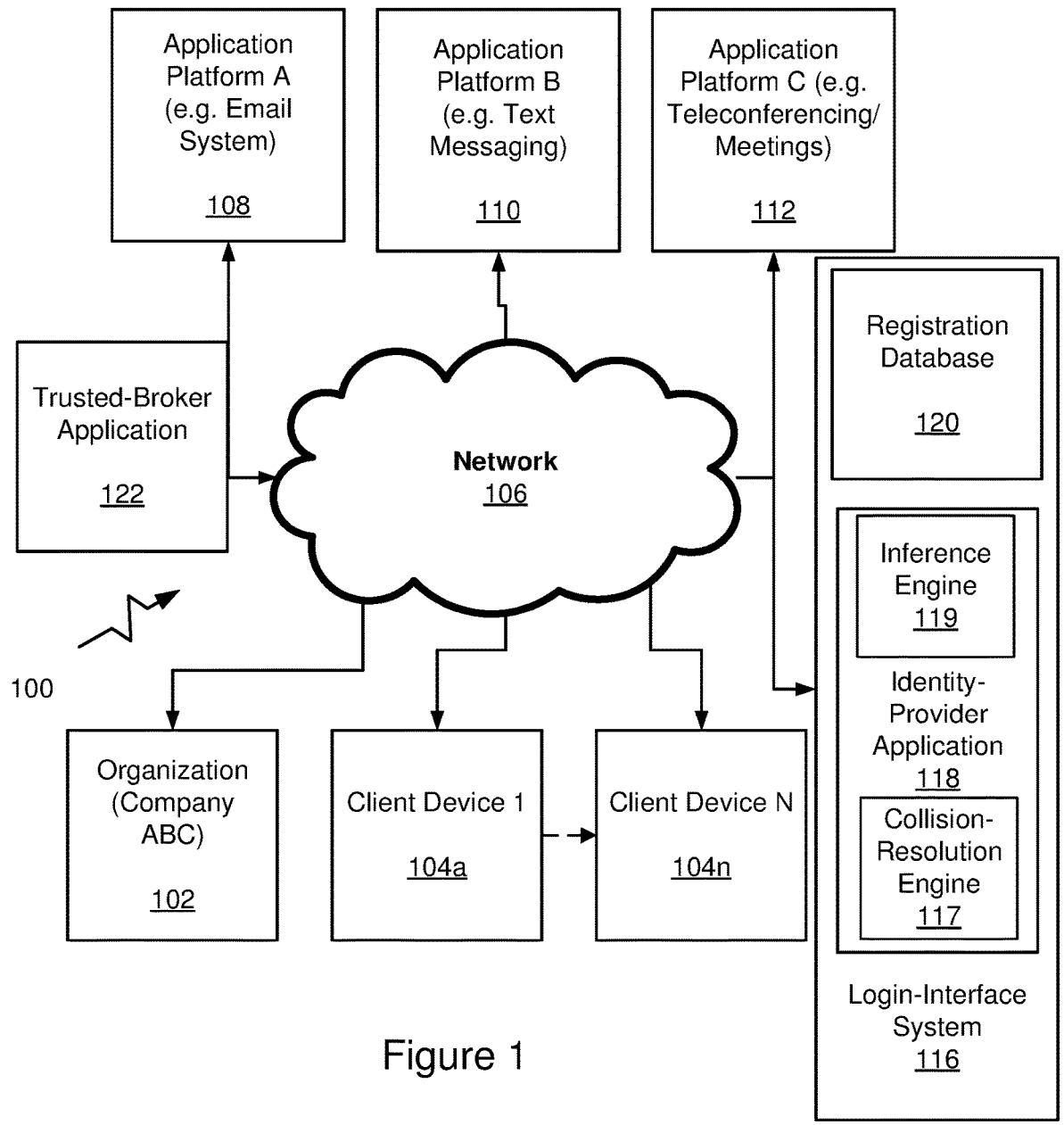
FIG. 1 illustrates an example computing environment in which users are required to login and use different software applications; the unique login-interface system in accordance with the present invention may be integrated into such a computing environment.

The detailed description discloses certain embodiments in FIG. 1 of a unique login-interface system 116 in accordance with the present system. In some embodiments, the login-interface system serves as a unified system or platform that may be integrated into any computing environment 100 to automatically and continuously track a user's use of identity credentials or aliases in different applications, systems, and organizations. The login-interface system 116 identifies and matches each user's current identity credentials as presented in the instance requested in a computing environment, with a set of identity credentials for that user that are continuously updated and periodically reconciled by an inference engine and a collision-resolution engine.

In some embodiments, the login-interface system 116 is implemented as a service configured such that users or an organization for its users may subscribe to it. Alternatively, the login-interface system 116 is configured as a program, application, or tool that may be integrated and easily used in any computing environment, such as the one illustrated. The login-interface system 116 advantageously provides an automated login capability that replaces the typical login process in every instance of access to a computing environment. The login-interface system 116 requires no other registration besides inclusion of a previously established identity in a messaging system of some type (e.g., an email system). In other words, consider a typical login scenario in which a user (e.g., John Doe) sends a message in a messaging system to a set of users (e.g., Jane Smith and Boy Cooper) using their USERIDs (e.g., JaneSmith&gmail.com) within the messaging system inviting them to participate in a session on the login-interface system 116. The USERID of the login-interface system 116 is included in the list of invitees. In some situations, users be introduced to the login-interface system 116 by an organization (e.g., company ABC) or by advertising, promotions, or simply by noting its identity in an invitation they receive. By way of example, the messaging system may be an email system, in which case, the USERIDs are email addresses and the login-interface system 116 is copied (corresponding to a "CC" in the email system) and receives the invitation, via an email addressing a list of USERIDs of the users who are invited. At this point, the login-interface system 116 checks with its registration database 120 for each of the users listed in the invitation, by using the USERIDs in the email list. If each USERID identified for each user is found in the registration database 120, a corresponding ServiceUserID is also located, thereby completing the login operation for each user. The completion of the login operation results in a number of actions by the login-interface system 116 including, but not limited to, sending of an authorization token or any other form of authorization message to complete the login process.

As another example, consider a text-messaging system. The example users in this scenario are User1, e.g., John Doe with a first telephone number (424)724-0831; User2, e.g., Jane Smith with a second telephone number (424)429-7412; and User3, e.g., Boy Cooper with a third telephone number (310)544-8821. A telephone number associated with the login-interface system 116 in this example illustration is (888)394-0000. In this particular messaging scenario, Boy Cooper invites John Doe and Jane Smith to a meeting by using a text message. Boy Cooper includes the phone number associated with login-interface system in a group text. This action activates the login-interface system 116 to add John Doe and Jane Smith to its list of real users to begin its operations as described here. In the example of a Slack messaging system, each of the three users User1 (John Doe), User2 (Jane Smith), and User 3 (Boy Cooper) use their names as their display names. Boy Cooper invites John Doe and Jane Smith to a meeting on Slack or such system. Boy Cooper includes the display name for the login-interface system 116 ("login service") in the group invite. This action causes the login-interface system 116 to add John Doe and Jane Smith to its list of real users in Table 1.

In instances when the login-interface system 116 of the present invention cannot find or locate a user's USERID in the registration database, the login-interface system 116 assigns a new ServiceID for the potential new user. This ServiceID may eventually become or identity a new user to the login-interface system 116 or in some instances, may later be identifies as a new USERID of an existing user known to the login-interface system. The login-interface system periodically runs a resolution process, which views ServiceIDs and attempts to match them with other existing ServiceIDs based on other information for each user that may be available. Such information may include, but not be limited to, a real name, an IP address, a telephone number, or any other identification information that may be available. It should be recognized that other information may be gathered by data or web scraping operations known to those of ordinary skill in the art. In some embodiments, if the login-interface system 116 identifies a possible match, it sends a direct communication to the particular user to confirm the match. The login-interface system 116 continues to add users without requiring them to explicitly sign up. Any potential new users are simply identified to the login-interface system 116 by being listed or copied in an email. The USERIDs that serve to identify users in some messaging system may serve as an automatic initiation of those users into the dynamic login-interface system 116. The login-interface system 116 of the present invention advantageously identifies the users and automatically signs them up. For existing users, the login-interface system 116 automatically identifies use of a new email address, telephone number or the like and will add such USERIDs to the existing user's records. Existing users are saved the time and effort to access a webpage or other management interface to change their information.

The messaging system with which a user has previously established or presented identity credentials may be any number of existing systems such as email, text messaging, phone calls, or any other messaging system used within an organization, enterprise, or a software application. Any application where a unique user identification was established for a particular user may serve as an initiating point.

It should be recognized that the present invention is a solution that dynamically and continuously tracks and updates user identity credentials and automatically issues authentication once a user's identity is reconciled or resolved. The present invention serves as a user identity management platform or software/hardware system that provides a unified approach that may be easily implemented and used across platforms and applications. The login-interface system 116 and the service it provides starts with creating or generating a list of real human users or people who wish to become users of the present system and service. In some embodiments, the service may be provided as software-as-a-service (SAS) or service (SAS) access management (AM) tool or program that may be integrated by any organization.

FIG. 1 illustrates an example computing environment illustrated generally by reference numeral 100, in which users of an organization, service, or platform, or other entity, sign into and use different software applications. An organization or service 102 (e.g., "Company ABC") represents any computing environment in any industry, for example, healthcare, public sector, energy, financial services, travel and hospitality, retail or the like. A computing environment typically must grant access to those who are either employees or members of an organization or are invited to participate in the organization's activities. The organization 102 may grant access to a number of client devices 104a through 104n (illustrated as Client Devices 1 through N) of different users, for example, the employees or members of the organization 102. In some embodiments, users of the client devices 104a through 104n may access a number of third-party applications as illustrated, via a network 106, which for reasons of security require user authentication or verification before a user can use any of the applications to which the user desires access. By way of example, these third-party applications as illustrated operate on Application Platform A designated by reference numeral 108, Application Platform B designated by reference numeral 110, and Application Platform C designated by reference numeral 112. Each of these illustrated platforms may operate systems as indicated, for example, an email system, a text messaging system, a tele-conferencing system, or a video-conferencing system. These software applications may also be any enterprise application including financial, retail, or the like. In some embodiments, the login-interface system 116 is integrated with any of the third-party applications operating on platforms 108, 110, or 112 or the organization or service 102 and is responsible for providing the current set of user credentials for user authentication before granting access. The login-interface system 116 is a platform or server that includes an identity-provider application 118, which is a software/hardware interface or an application programming application (API) that may be offered as a service to other software services. The identity-provider application 118 serves to track any and all previous user identification credentials used by users to dynamically provide a current set of user credentials before issuing authentication for each user in the instance that it is required. The login-interface system 116 includes the registration database 120, in which user identification credentials are stored after a reconciliation and resolution process is performed by a collision-resolution engine 117 and an inference engine 118 to identify and resolve current identity credentials for an existing user or a new user.

It should be recognized that in some embodiments, the login-interface system 116 may be integrated with identity trusted-broker applications 122 on the client devices 104a through 104n that serve as an intermediary between the login-interface system 116 and the applications for which users are verified. As is known to those skilled in the art, such identity broker applications serve as an additional layer to shield applications from the need for specific details about the identity-provider application 118 or the organization 102 if preferred by either entity. The trusted-broker application 122 may be one or more software layers configured in an architecture that may serve to authenticate a set of credentials for a user with credentials provided by the login-interface system 116 and once the authentication is approved, fetch temporary authentication credentials (in some instances a token) and return it to the requester (e.g., the application). In some embodiments, the login-interface system 116 may also be integrated with other single sign-on providers (SSO) also designed to reduce password fatigue and facilitate connections between cloud computing resources and users, therefore, decreasing the need for users to re-authenticate when using mobile and roaming applications. Examples of other identity providers include, but are not limited to, IndieAuth, which is an open standard, decentralized authentication protocol that uses OAuth 2.0 and enables services to verify the identity of a user represented by a URL as well as to obtain an access token that may be used to access resources under the control of the user. In the IndieAuth model, a user's identity links to his or her preferred identity provider, which may be the user's own site. or alternatively, may be delegated to a third-party authorization endpoint. OpenID Connect (OIDC) is an identity layer on top of OAuth. In the domain model associated with OIDC, an identity provider is a special type of OAuth 2.0 authorization server. Specifically, a system entity called an OpenID Provider issues JSON-formatted identity tokens to OIDC relying parties via RESTful HTTP API. The Security Assertion Markup Language (SAML) is a set of profiles for exchanging authentication and authorization data across security domains. In the SAML domain model, an identity provider is a special type of authentication authority. Specifically, a SAML identity provider is a system entity that issues authentication assertions in conjunction with an SSO profile of SAML. A relying party that consumes these authentication assertions is a SAML service provider.

The organization 102 is illustrative of any entity, such as a corporation, a school, a non-profit entity, a third-party service provider, a governmental department, or the like. The organization 102 may be made up of a number of computing systems, including the client devices 104a through 104n, one or more internal networks that connect the computing systems, including routers or other networking devices that define the boundary between the organization and external networks and the like.

In some instances, the organization 102 may have one or more device security policies that specify conditions for the client devices 104a through 104n to satisfy in order to be permitted to sign in or login to the applications (e.g., those on platforms 108, 110, and 112). For example, the conditions may specify that the client devices 104a through 104n use a particular encryption scheme for encrypting communications or that the client device have a particular security application installed, or the like. In some embodiments, the device security policies may be embodied in digital certificates associated with the organization 102. When a client device 104 is enrolled by the organization 102 so that it is permitted to access resources of the organization, the device security policy is stored on the client device 104 so that it may later be verified that the device 104 is conforming to that security policy.

The identity-provider application 118 manages user access to applications, services, and other resources for which user authentication is required. The identity-provider application 118 of the login-interface system may be located at a location external to the organization 102, e.g., connected to the organization via network 106, as illustrated in FIG. 1. Alternatively, the identity-provider application 118 may be located within the boundaries of the organization 102 and administered by the organization itself.

In some embodiments, the identity-provider application 118 comprises the registration database (DB) 120 that serves as a user-access rights database 120, which stores (e.g., in encrypted form) user credentials that are dynamically updated (reconciled in periodic intervals) in accordance with the present invention. The updated or current use credentials are used to authenticate a user. The registration database (DB) 120 may additionally contain other information, such as a list of the applications to which the various users have access relating to the organization 102, the particular functionality available to the users within those applications, and the like.

The login-interface system 116 includes the collision-resolution engine 117 and an inference engine 119 to perform reconciliation and resolution functions to determine user identity credentials for users. In instances when multiple users have the same USERID, the collision-resolution engine 117 performs resolution operations to ensure that user identification credentials are unique. Each user must have unique identification credentials to identity the user to the login-interface system 116 for use in other applications. The collision-resolution engine 117 resolves non-unique identity credentials in several ways. The collision-resolution engine 117 may resolve non-unique identity credentials by age, according either the oldest or the newest user the identity credentials shared by the multiple users and assigning other unique identity credentials to the others. Alternatively, the collision-resolution engine considers factors to establish similarities between the multiple users and the duplicated identity credentials and accords them to a user that shares the most similarities. For example, if a user resides with the same country. A suspicious foreign user may be tagged for fraud consideration. To the other users, the collision-resolution engine 117 assigns different unique identity credentials.

In instances where a particular user may decide to use different client devices 104a through 104n to participate in an application session, for example, user a desktop for video participation and a telephone for audio participation, the inference engine 119 effectively reconciles user identity credentials. The same user using two different client devices 104a through 104n would be initially identified as two different participants (each with a different participant identification). This misinforms any application or system on the number of participants in an event. The inference engine 119 with time and repeated use, correlates instances of the same participant (person) using different devices (different participant identification), by tracing the different participant identification to the same telephone and eventually to the same user. In such scenarios, the inference engine refers to its knowledge base as known to one skilled in the art and infers that the two participants are in fact one user and combines the information for each to update the record for the single user participant.

The client devices 104a through 104n are computing devices such as smart phones, laptop computers, desktop computers, or any other device that can execute third-party applications operating on any of the third-party platforms (108, 110, 112) and provide access by to users who want to access these applications to participate in their functionalities.

A third-party application, examples of which are illustrated as operating on platforms (108, 110, and 112) are software application usable via the client devices 104a through 104n, such as an enterprise e-mail application, an application or plug-in for accessing an enterprise file system, an enterprise database, or the like. The application is termed a "third-party" application in that it may (though need not necessarily) be authored by an author other than the organization 102. In one embodiment, the third-party application's user interface is implemented in HTML or other web-based technology and is rendered within an embedded browser of the client devices 104a through 104n.

The third-party application may be aware of the existence of the identity-provider application 118 and has the ability to direct a client device (any of 104a through 104n) of a user to the identity-provider application 118 for authentication. (For example, an administrator of the organization 102 can specify the identity and network information for the identity provider-application 118 in configuration files accessed by the third-party applications (on platforms 108, 110, and 111). In most instances, the third-party applications lack the credentials of the user and the ability to access the saved credentials, nor does the third-party application innately have the ability to follow the protocols used to communicate with the identity-provider application 118 and with the trusted-broker application 122 in the instances that it is used. These capabilities may be added to the third-party application via a client script provided by the identity-provider application 118, in embodiments that execute this solution as a program or tool that is integrated by an organization.

In such embodiments, the trusted-broker application 122 may be an application installed on each client device 104a through 104n of the organization 102 for which a dynamically updated sign-on is required and provided. The trusted-broker application 122 may be created by the same author as the identity-provider application 118 to serve as an intermediary between the identity-provider application 118 and the third-party applications (which do not have the specifics of the particular identity-provider application or any other that is involved).

The present invention is well suited to a wide variety of computer network systems over numerous topologies. Within this field, the configuration and management of large networks comprise storage devices and computers that are communicatively coupled to dissimilar computers and storage devices over a network, such as the Internet. The network 106 may be any suitable communications network for data transmission. In an embodiment such as that illustrated in FIG. 1, in which the identity-provider application 118 is located outside of the organization 102, the network 106 uses standard communications technologies and/or protocols and can include the Internet. In another embodiment, the entities may use custom and/or dedicated data communications technologies. The network 106 that couples the various platforms may include an Ethernet, Token Ring, Firewire, USB, Fiber Channel or other network type.

The multiple different client/user computing devices 104a through 104n may connect via the network 106 over multiple sessions. An initial login display may be used and data may be synchronized with the cloud services as required. Each user/client's data may be stored in one or more backup servers, or synchronized with one or more web services or stored locally on user/client device 104a through 104n, as required. Data may be encrypted on a per-client basis and encryption of data on the user/client device may be implemented using login credentials (a "passcode") as a portion of the encryption key. Any automated processes in the pre-connection phase—for example, an encryption key that encrypts a client's data may be derived from the client's passcode.

A backup server comprising a computing system may store each user's data in an encrypted form. Cloud services may include cloud-based services such as Apple iCloud®, Google Docs, a cloud storage service, or other service to which client device can synchronize data between the client device and cloud storage service.

Web services may include email, social networks, on-line classrooms, document storage services, such as Dropbox®, and other web-based services. Internal components of user/client device 104 may include storages, operating system including kernel (connecting system hardware to application software), and user-space processes. Internal components of client device can communicate via inter-process communication, messaging, shared memory, sockets, or other communication channels. Storages can include RAM, ROM, flash memory, a hard disk, a solid-state disk, CD-ROM, DVD-ROM, rewriteable media, or other storage medium.

It should be recognized that interactions typically take place between different entities of FIG. 1 when verifying the identity of a user as part of a login to applications, according to an embodiment in which the client devices 104a through 104n are smartphones, and the applications are native applications executing on the smartphones. Native smartphone applications typically lack full support for cookies, which could otherwise be used to aid the authentication process. Alternatively, desktops or other devices may be used.

Specifically, consider a scenario in which a user of a client device 104a through 104n wishes to obtain access to one or more third-party applications executed via the client device 104a through 104n, where the access requires user identification or authentication, and the user wishes to avoid re-entering authentication information for every instance of access, version of application, or for every separate application. Accordingly, to support a successful login, and to avoid obliging third-party applications to conform to details of the identity-provider application 118, it may provide a client script to the trusted-broker application 122 designed to handle the details of communication with the identity-provider application 118. The communication details may include generation and use of a token with public and private portions, which may be used to confirm each user's identity.

Accordingly, the user initiates a login process (e.g., by sending a message) to identify the user to the identity-provider application 118, after which the identity-provider application 118 transparently handles authentication of that user with each separate third-party application that the user uses. As part of this process, at a time of enrollment of the client device 104a through 104n (for use with the organization 102 or any application), the client device 104a through 104n stores the device security policy provided by the organization for that device, e.g., in the form of a security certificate. In one embodiment, the initiation of the login process may involve a user launching the trusted-broker application 122 and providing the user's credentials for the identity-provider application 118 (e.g., a username and password imported from any messaging system used by a user). Based on the imported user credentials, the trusted-broker application 122 stores information that will allow it to communicate with the identity-provider application 118 in the future. The information may be, for example, either the user's credentials themselves or information obtained based on the user's credentials. As an example of the latter, in some embodiments the identity-provider application 118 provides the trusted-broker application 122 with a token that remains valid for some period of time (e.g., two hours). The trusted-broker application provides the stored information (e.g., the token) to the identity-provider application 118 as a means of authenticating itself whenever it communicates with the identity-provider application 118.

The user then launches the third-party application of interest, and the code of the third-party application requests the identity-provider application 118 to verify the user identity. In one embodiment, the identity-provider application 118 identifies the third-party application in order to ensure that the application is one for which the organization 102 has authorized a login by current user credentials that are dynamically updated as will be described in more detail below. The identity-provider application 118 can identify the third-party application by, for example, reading an application identity string or other identifier included by the third-party application within an HTTP message embodying the identity verification request.

In some embodiments, the identity-provider application 118 may further generate a token that is later used to establish the identity of the user. In some embodiments, the token may a public portion and a corresponding private portion, the public and private portions having been generated together, such that one portion may be matched against the other portion. For example, the public and private portions may respectively be public and private keys of a key pair of a public key cryptosystem or the like.

The identity-provider application 118 may also in some instances generate a notification via a user interface (e.g., specified in HTML) that informs the user of the status of the actions taking place, such as noting that the trusted-broker application was detected and that the user is in the process of being automatically signed in.

A client script may be included within code for the user, which is code that is responsible for implementing, on behalf of the third-party application, operations of an authentication protocol used by the identity-provider application 118. For example, in one embodiment the authentication protocol may be OAuth (Open Authorization, which is an open standard for token-based authentication and authorization which is used to provide single sign-on (SSO). OAuth allows an end user's account information to be used by third-party services, such as Facebook, without exposing the user's password. The client script is embodied in code of a client-side scripting language such as JavaScript. In one embodiment, the same client script is provided to each third-party application for which single sign-in functionality is desired. In one embodiment, the client script may also perform a number of operations, such as determining whether to show a traditional login, a single-sign-on interface or indicate that the login is bypassed if current user credentials are located and automatically provided by the present system.

The identity-provider program 118 then provides the generated user interface code and client script to the third-party application that executes on the client device 104a through 104n. The client script 104 executes automatically after it is received by the third-party application of the client device 104a through 104n, running within the script runtime engine of the embedded browser in which the application executes. In some embodiments, the client script requests the token generated for authentication from the responsible program after verification by the identity-provider application 118. The public portion of the token is used later to establish the identity of the user whose identity is being verified. The client script may also invoke the trusted-broker application, upon receiving the public portion of the token. In one embodiment, the client script accomplishes the invocation using an authenticatable link. An authenticatable link is a uniform resource locator (URL) having a network domain portion that is interpreted by the operating system of the client device 104a through 104n by querying a service running in that network domain to determine which application corresponds to that domain, and then executing that application. Examples of authenticable links are Universal Links (used in the IOSTM operating system) and App Links (used in the ANDROID™ operating system). The use of authenticable links ensures that the application that is invoked for the authenticable link is the application specified by the domain indicated in the link. The trusted-broker application 122 may verify that current credentials for the single sign-on for the third-party application is appropriate. For example, the trusted-broker application 122 identifies the third-party application (e.g., based on identifiers of the third-party application provided by the identity-provider application 118) and verifies that the application is trusted and that the user has permission to use it. The trusted-broker application 122 may be configured to know the identity of the user and to verify that the client device 104a through 104n conforms to the device security policy of the organization 102. That is, the trusted-broker application 122 may access the device security policy (e.g., embodied as a certificate) obtained during enrollment of the client device 104a through 104n and ensures that the client device fulfills each of the requirements (e.g., uses a certain type of encryption for communications) at the present moment. Verifying conformance to security policies at time of sign-in addresses the danger that client device 104a through 104n conformance was last verified at an earlier time period and that the client device 104a through 104n has been altered to no longer be in conformance. Assuming that the verification is successful, the trusted-broker application provides an indication back to the identity-provider application 118 that the verifications were successful, in some instances with the public token portion. The identity-provider application 118 attempts to match the public portion of the token against the stored private portion. If the portions match, the identity-provider application determines that the message from the trusted-broker application is genuine, rather than fraudulent, and accordingly, determines that the user was in fact authorized to use its current credentials to sign-in for the third-party application. Since the trusted-broker application verified that the user was authorized, it is appropriate at this point to allow sign-in requests for the user. Accordingly, the identity-provider application 118 associates the user with the third-party application and with the public portion of the token and notifies the trusted-broker application 122 that the association is complete by sending a message over the network 106. The trusted-broker application 122 in turn invokes the third-party application.

In yet another embodiment, the identity-provider application 118 does not explicitly notify the trusted-broker application 122 that the association of the user with the third-party application is complete. Rather, the trusted-broker application 122 instead periodically polls the identity-provider application 118, passing it the private token portion to identify the user and third-party application in question. With the identity of the user verified, the identity-provider application 118 initiates the actual authentication flow for the third-party application, which proceeds according to the authentication protocol used by the identity-provider application 118 (e.g., OAuth) and may use data interchange formats such as Security Assertion Markup Language (SAML). As part of the initiation, the identity-provider application 118 includes an indication of the verification of the user's identity and permission to bypass the sign-in for the third-party application. For example, the identity-provider application 118 can provide the third-party application with an OAuth token (distinct from the token generated before) that establishes the rights of the requesting user to use the third-party application. With authentication of the user having successfully completed, the third-party application then executes. If the user wishes to use other third-party applications, after initiation of sign-in and use of currently user credentials, the same steps may be repeated for each distinct application that the user uses.

Figure 2:
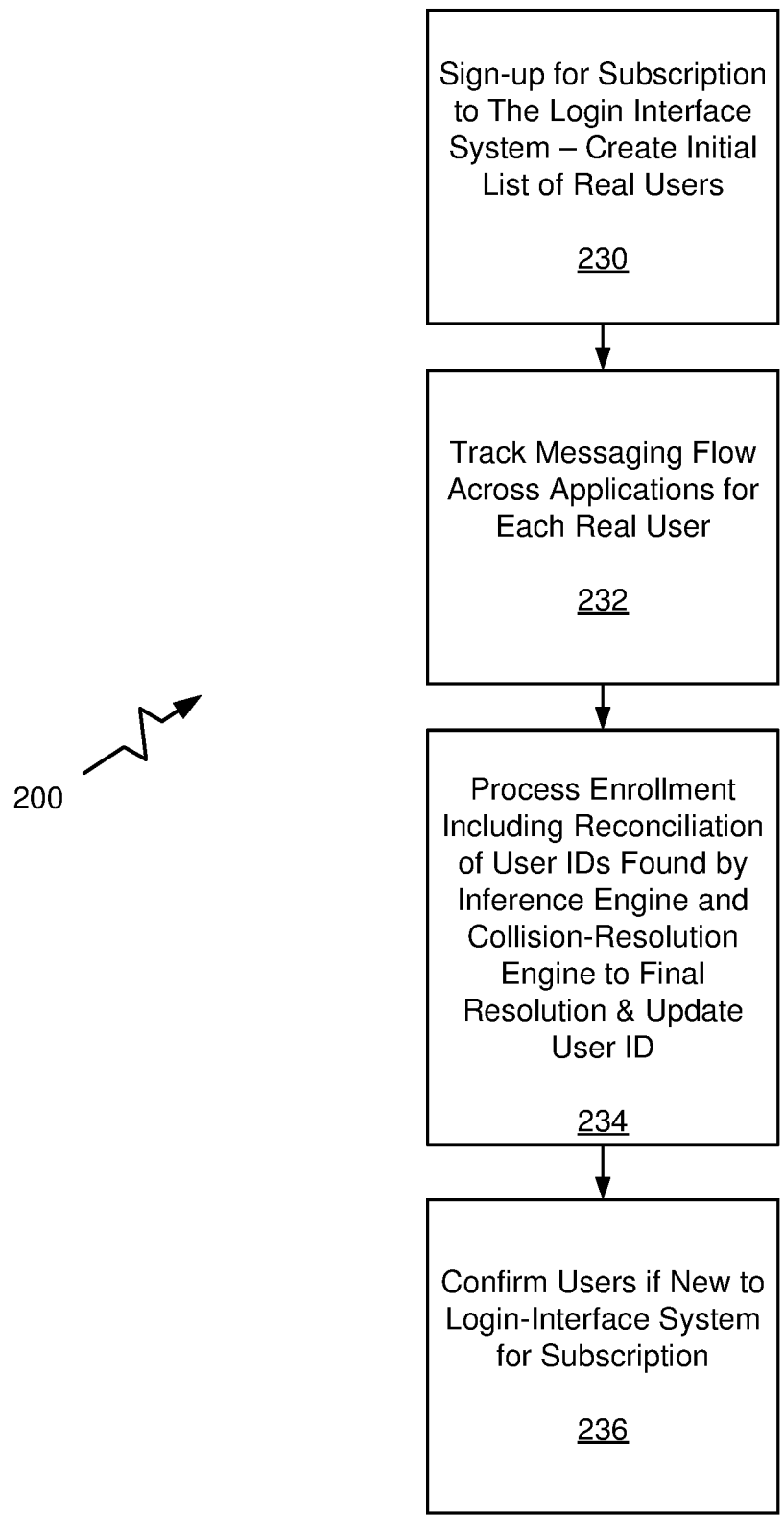
FIG. 2 is a flow chart of the various stages of the login-interface method within the computing environment illustrated in FIG. 1 in accordance with one embodiment of the present invention.

FIG. 2 illustrates the process 200 for eliminating a traditional login process or determining current user credentials for a single login if required. The process 200 starts at block 230, which illustrates one or more operations for sign-up for a subscription to the login-interface system 116 including creating an initial list of real users (e.g., John Doe, Jane Smith, etc.). The process continues at block 232, which includes one or more operations for tracking messaging flow across applications for each real user (e.g., John Doe). The process continues at block 234, to enrollment steps including reconciliation of user identifications (aliases) found and final resolution (by the collision-resolution engine 117 and inference engine 119) to update user identities or credentials. The process continues at block 236, including one or more operations for confirming users if new to the login-interface system subscription as well as confirming current user credentials for users. More details of this process are described below.

Example high-level code may be written as follows:
ID=ReadID( );
SystemID=MatchID(ID);
If (SystemID==NULL) SystemID=MakeNewID( );
MatchID(ID)
Check all database records for ID;
If ID found then return SystemID of found record;
Else return NULL;
Reconcile( )—run periodically
Merge SystemIDs that are for the same USER using matching or similar fields.

Figure 3:
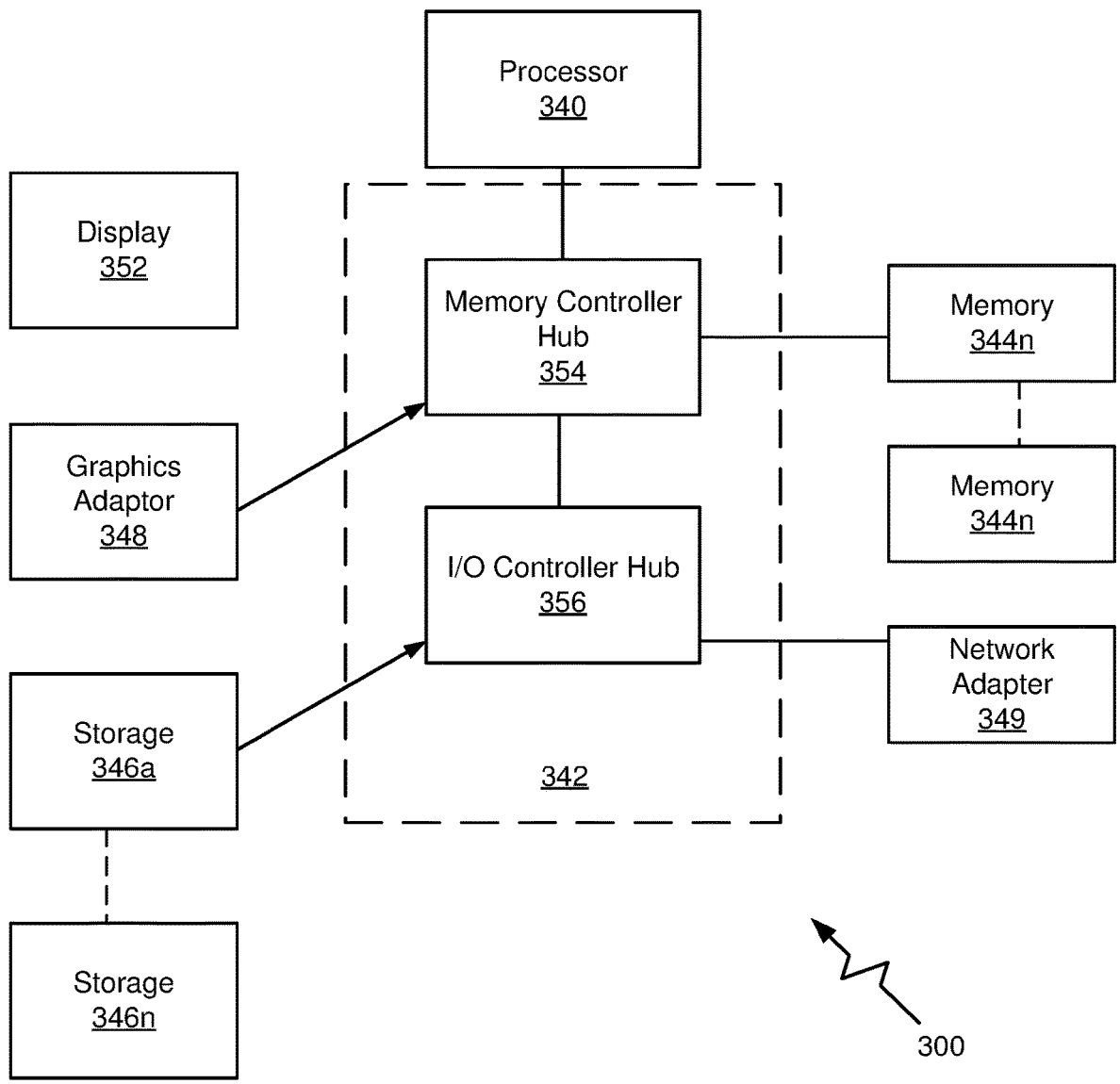
FIG. 3 is a high-level block diagram illustrating physical components of a computer used as part or all of the client device or login-interface system shown in FIG. 1 in accordance with one embodiment of the present invention.

FIG. 3 is a high-level block diagram illustrating physical components of a computer 300 used as part or all of the client device 104a through 104n or the login-interface system 116 or its identity-provider application 118 illustrated in FIG. 1. FIG. 3 illustrates at least one processor 340 coupled to a chip 342. Also coupled to the chip 342 are a memory 344a through 344n (depending upon the memory required), a storage device 346a through 346n (depending upon the storage required), a graphics adapter 348, and a network adapter 349. A display 352 is coupled to the graphics adapter 348. In one embodiment, the functionality of the chip 342 is provided by a memory controller hub 354 and an I/O controller hub 356. In another embodiment, the memory 344 is coupled directly to the processor 340 instead of the chip 342. The storage device 346 is any non-transitory computer-readable storage medium, such as a hard drive, compact disk read-only memory (CD-ROM), DVD, or a solid-state memory device. The memory 344 holds instructions and data used by the processor 340. The graphics adapter 348 displays images and other information on the display 352. The network adapter 349 couples the computer to a local or wide area network.

As is known in the art, a computer can have different and/or other components than those shown in FIG. 3. In addition, the computer 300 may not have certain of the illustrated components. In one embodiment, a computer acting as a server may exclude a graphics adapter 348, and/or display 352, as well as a keyboard or pointing device. Moreover, the storage device 346 may be local and/or remote from the computer (such as embodied within a storage area network (SAN)).

Figure 4:
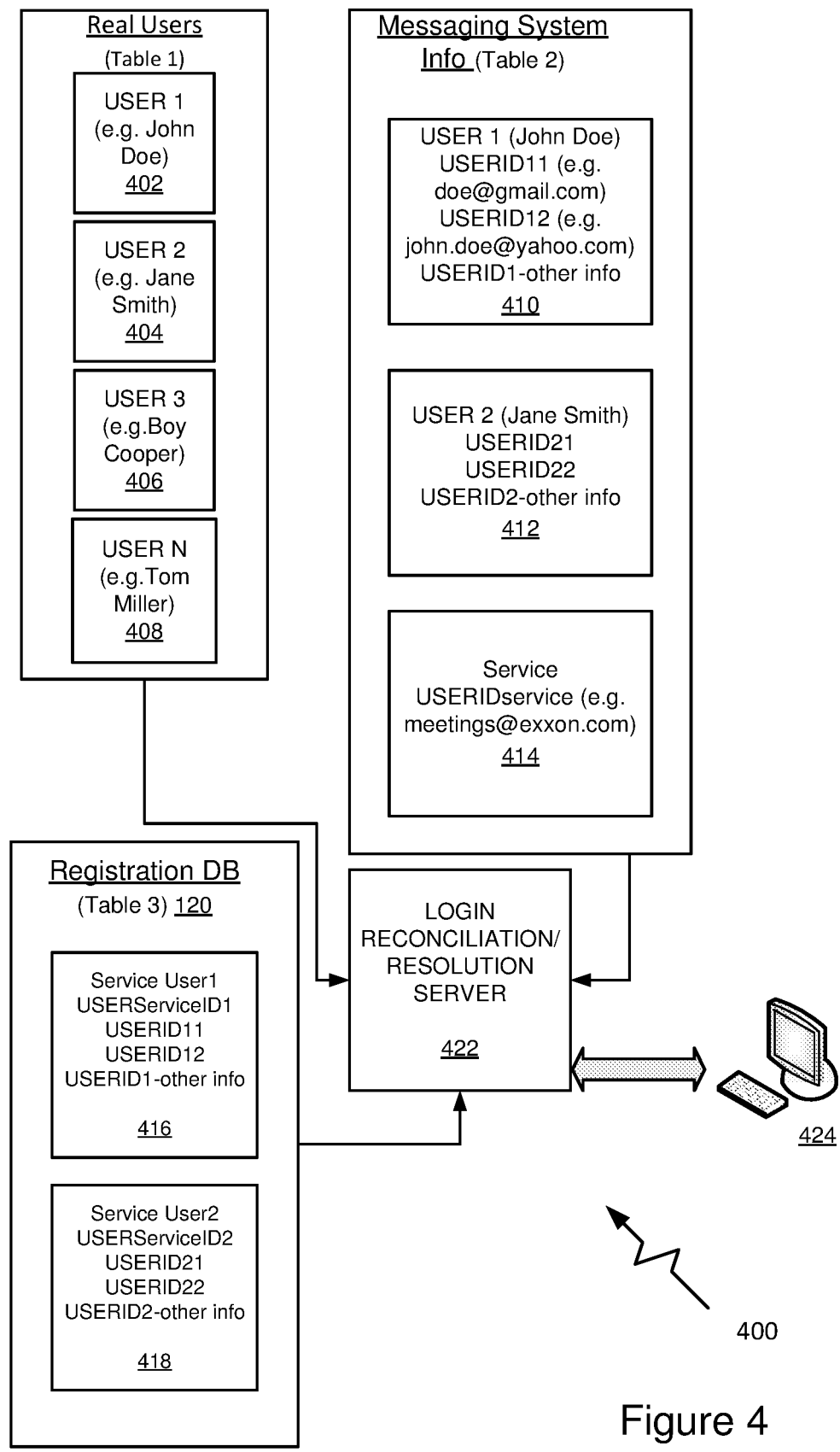
FIG. 4 illustrates a block diagram of the system architecture of login-interface system in accordance with one embodiment of the present invention.

Referring now to FIG. 4, components of the login-interface system 116 are illustrated generally at 400 including a desktop computer 424. An example list of "Real Users" is illustrated in table format ("Table 1"). As illustrated, each of the users (e.g., John Doe, Jane Smith, Boy Cooper, or Tom Miller) is separately identified. In the illustrated examples, a first user is referenced as "USER1" (e.g., John Doe) and designated by reference numeral 402, a second user (e.g., Jane Smith) is referenced as "USER2" and designated by reference numeral 404, a third user is referenced as "USER3" (e.g., Boy Cooper) and designated by reference numeral 406 and so on, until a user referenced as "USERN" (e.g., Tom Miller) is designated by reference numeral 408. The list may include a threshold such that users are listed and designated up to the threshold and a new list is created once the threshold is met. For example, a first "Table 1" may include a list of 100,000 users, the second another 100,000 users and so on. These users may or may not have already joined the login-interface system 116 to become members. For the purpose of this disclosure, login-interface system 116 may otherwise be referred to as a sign-in service, program, or application, for which users must sign up or join. The login-interface system 116 is configured to provide easy access to any of a very wide variety of applications or services such as a rating service, a news service, a virtual meeting service, a retail application, a financial application or the like. The login-interface system 116 of the present invention may be easily integrated into any cloud-based enterprise application to integrate with partner infrastructure as needed.

In accordance with some embodiments, the login-interface system 116 has a registration database (DB) 120 (also shown in FIG. 1) shown in FIG. 4. The database 120 may be configured in a table format ("Table 3"). As is well known in the computing industry, all the information in a database is organized and structured in database tables. The tables are stored on the hard disk of the database server. The database tables hold the actual information. This structure is chosen for its ease of use, so it can be easily indexed, accessed, or modified. The information may be typically saved in one of the many known types of files. The Registration database (DB) 120 includes a list of users (e.g., John Doe, Jane Smith etc.) who have been registered for a particular service or application. Each entry 416 designates an identifier, for example, "Service Usern." In this example, the identifier "Service Usern" designates the service or application for which a particular user is registered. The "n" in this identifier represents the user number for the particular service, from 1 to n. Each entry 416 also designates a "USERSERVICEID" to identify a particular user within the login-interface system 116 or its service. For example, for a Service User1, entry 416 shows by way of example, USERService1D1 (USER1D11, USER1D12) and USERID1 to cover other information. Another entry for Service User2 may include "USERService1ID2" (USERID21, USERID22) and USERID2 to cover other information. Also, all of the "USERIDs" used by a particular user in any messaging system that the user communicates with are gathered and recorded with use. Finally, there is a set of other information collected on each user of the login-interface system 116 or its service that is the set of all information and data that the system/service knows or is aware of about a particular user, such as an IP address for the user (e.g., John Doe), age of the user (e.g., John Doe), time of day that the user (e.g., John Doe) used the login-interface system 116 or its service etc. This set of information or data is used in the resolution process performed by the login reconciliation/resolution server 422 (including the collision-resolution engine 117 or inference engine 119) of the login-interface system 116 or its service in an attempt to identify an unknown user. The computer 424 is coupled to the login reconciliation/resolution server 422. All these identifiers and other information are shown in blocks 416 and 418 within the registration database (DB) 120.

Figure 5:
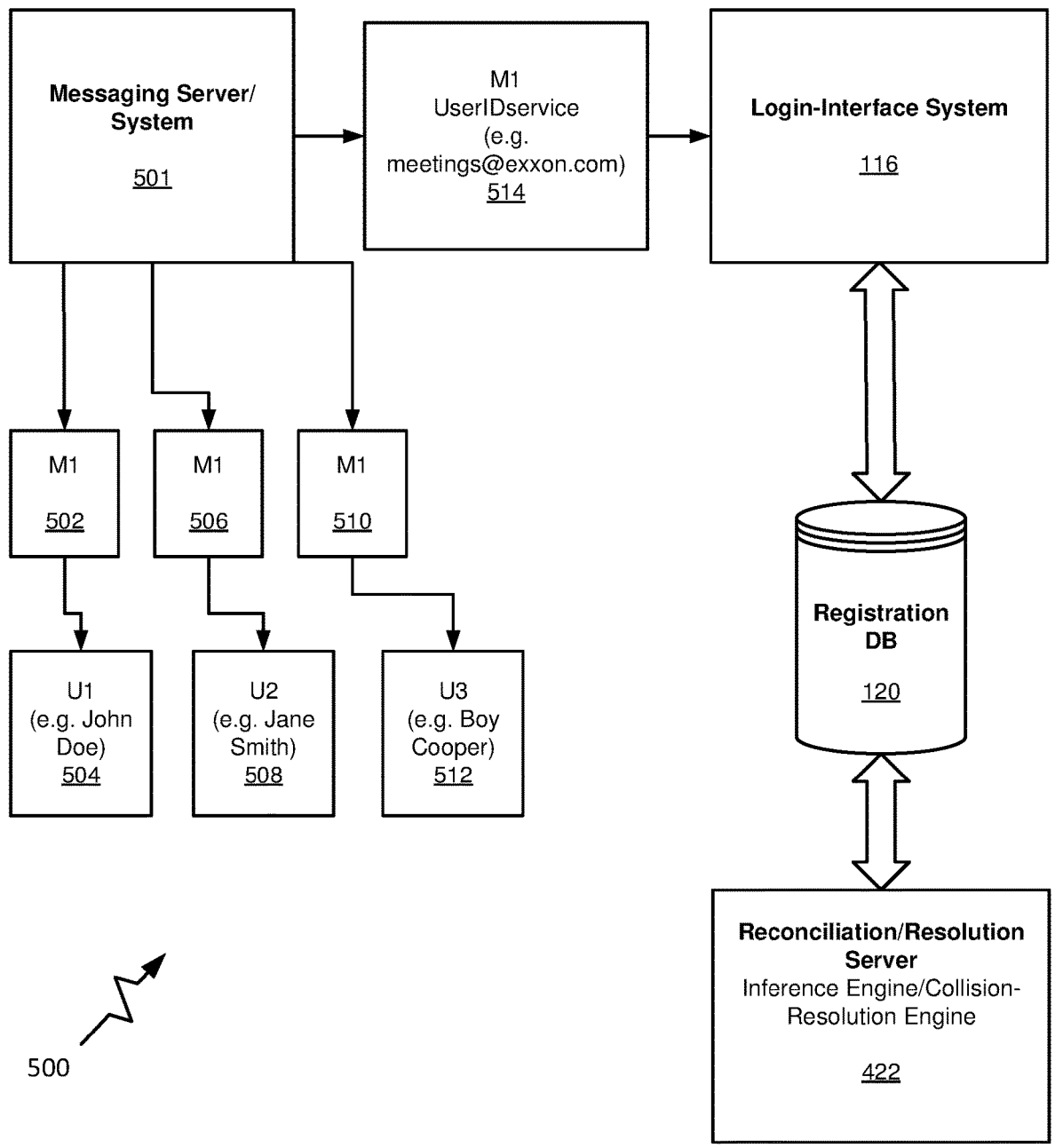
FIG. 5 illustrates another block diagram representation of the system architecture of the login-interface system in accordance with one embodiment of the present invention.

Referring now to FIGS. 4 and 5, the login-interface system 116 in accordance with the present invention in illustrated in a system architecture 500. The login-interface system 116 also includes and maintains a database of messaging system information 501, a version of which is depicted in Table 2, and captioned "Messaging System Info" (FIG. 5), which lists each known human user (e.g., John Doe, Jane Smith, and Boy Cooper) and each messaging system ID that the user has used. Every time that login-interface system 116 receives a message, the USERIDs used are either matched within this database of messaging system information 501 or they are added to the database to form a potential new user. The information in this database 501 is illustrated in blocks designated by reference numerals 410, 412, and 414 in FIG. 4.

Referring now to FIG. 5, a typical login scenario in the system architecture 500 by a user is illustrated. A user sends a message "M1" on or via the message system 501 (integrating, coupled to, or otherwise associated with login-interface system 116) to a set of other users using their USERIDs within the message system 501, inviting them to participate in a session on the login-interface system 116 or its service with or without prior subscription. The message "M1" is the same invitation message sent to all of the users as well as the system or service, hence labeled as "M1" in all the representations. However, each message M1 is separately designated by reference numerals 502 (sent to user U1 (e.g., John Doe—504), 506 (sent to user U2 (e.g., Jane Smith)—508), 510 (sent to user U3 (e.g., Boy Cooper)—512), and 514 (sent to the login-interface system 116 or its service), because the messages although with the same invitation content may be slightly different in each case because of different addressing. The message M1 may also be updated from time to time if the context of the invitation changes. An example of this is a ticketing system where an event or issue is updated from time to time. The USERID of the System or Service is included in the list of invitees (see M1—514) sent to the login-interface system or its service 116. In this example that is illustrated, the message system is an email and the USERIDs are email addresses. It should be recognized that the Messaging Server/System 501 has a processor 340 (FIG. 3) or computing capability (see FIG. 3 for full hardware configuration) configured to operate all the functional tasks. The processor 340 (CPU) is the logic circuitry that responds to and processes the basic instructions that drive the computing system within the Messaging Server/System 501. The CPU is the main and most critical integrated circuitry (IC) chip 342 in the computing system, responsible for interpreting most of the computer commands. The login-interface system 116 (with its service 116) also has a processor with the instructions or operations contained within executable computer programs. The processor receives instructions from memory, which stores the executable computer programs.

The login-interface system 116 receives the invitation, in this example an email (M1), with a list of USERIDs of the users, for example, user U1 (e.g., John Doe) 504, user U2 (e.g., Jane Smith) 508, user U3 (e.g., Boy Cooper) 512 etc., who are invited. In some illustrated embodiments 514, this corresponds to a copied or "CC" list in an email system (e.g., meetings@exxon.com). At this point the login-interface system 116 checks with the registration database (DB) 120 for each of the USERIDs used in the invitation. If a USERID is found in the registration database (DB) 120, a corresponding ServiceUserID is automatically located. At that point, the particular user may be considered by the login-interface system 116 to be logged in. This can result in any number of actions by the login-interface system 116, including but not limited to, sending of an authorization token or some other form of authorization message as described above.

In the event that the USERID is not found in the registration database (DB) 120, the login-interface system 116 assigns a new "ServiceID" for the potential new user. This new "ServiceID" may eventually identify and become a new user of the login-interface system 116 or alternatively, may later be identified as a new "USERID" for an existing user. If a new user is established, the new user is added to the list of real users in Table 1 (FIG. 4).

The login-interface system 116 periodically runs a resolution process by its Login Reconciliation/Resolution Server 422 (in FIGS. 4 and 5). This process looks at "ServiceIDs" and tries to match them with other existing "ServiceIDs" based on other information that may be available. Such information may include, but not be limited to, real name, IP address, telephone number, or any other identification information that may be available. In the case of a possible match, the login-interface system 116 in some embodiments, formulates a query and sends the query out by direct communication to a particular user (e.g., John Doe) to confirm the match.

In this way, the login-interface system 116 adds users (e.g., John Doe), without requiring them to explicitly sign up in accordance with a traditional process. Any potential new users are simply listed or identified on a copy "CC" list on an email. The login-interface system 116 intelligently and automatically determines who the users are and signs them in to the login-interface system 116 as needed. Further, if an existing user is using a new email address or phone number, the login-interface system 116 automatically figures that scenario and adds that "USERID" to the user's records without the user having to go to a webpage or other management interface to change or update the information. Uses are advantageously saved time and effort.

Messaging services such as email, text message, iMessage, or Slack may be used as part of this process or method. Any information at hand may be used to tie together or link a new "USERID" with an existing account. In a worst-case scenario, if a link or tie is not established, the login-interface system 116 or associated service creates a temporary new "ServiceID" until the existing users can explicitly inform the login-interface system 116 that the new "ServiceID" corresponds to their existing "ServiceID." The client devices 104a through 104n illustrated in FIG. 1 are any electronic device for use by the users, such as a desktop, tablet, watch, or a mobile phone, by which users may access the login-interface system 116.

Consider use of this login-interface system 116 for a virtual meeting event. When the present login-interface system 116 determines that it has been invited to a virtual meeting, the login-interface system 116 harvests the email addresses or other contact information for the other participants invited to the virtual meeting. These indicia of information for the participants are reconciled with existing records of prior participants and meetings to determine if the login-interface system 116 has seen them before or if they are genuinely new. This process makes adding new participants user friendly. The login-interface system 116 tracks participants as they use different or changing contact information. The login-interface system 116 is adaptive and identifies current user credentials periodically or continuously. The present login-interface system 116 may also track participants regardless of what meetings they are in and what types of meetings they are, independent of the "situation" or company associated with their meetings. If the login-interface system 116 finds that it has genuinely new participant solicitations, they can be sent to have them added to the login-interface system 116 or they are maintained as guests.

Once the login-interface system 116 determines that it has been included in a meeting invitation, a record is created to hold information related to the upcoming meeting. It should be recognized that meetings may be scheduled from anywhere (e.g., mobile devices etc., as shown in FIG. 1). In operation, the Messaging System 501 or each device 104a through 104n (or in combination) creates an object representative of the meeting request and assigns the object a global identification number which uniquely identifies the object to other devices which encounter the object (e.g., devices 104a through 104n used by Users U1 (e.g., John Doe), U2 (e.g., Jane Smith), and U3 (e.g., Boy Cooper)). Other devices which encounter the meeting request are capable of identifying it as a unique meeting request in order to alleviate the problem of duplicate meeting request transmissions. To track emails and/or invitations, an electronic mail application or calendar application on the mobile/other device 104a obtains a fully qualified electronic mail address for the potential attendees from an address book or directory stored or prior use.

In some embodiments, the Messaging System 501 or login-interface system 116 or user devices may create the meeting object and the electronic mail meeting request object using a set of properties which are supported by a plurality of PIMs (Personal Information Manager (PIM) solutions) that may receive the objects. This provides compatibility with an increased number of devices which are likely to encounter the objects. Localizers implement a plurality of templates (e.g., for surveys relating to a meeting) used in formatting the properties of the objects associated with the meeting request. A data stream representative of the meeting request is parsed by the device and placed in pre-defined fields in the appropriate templates for surveys or whatever. In some embodiments, the device 104 (mobile/computer) includes an application program and object Store. All devices 104a through 104n are linked to the login-interface system 116 or such platform hosting the meetings or meeting platform in a distributed environment by one of a plurality of connection mechanisms.

In one example, the application program on the device 104a may be a personal information manager (PIM) which supports electronic mail messaging, scheduling and calendaring and an address book containing contact information. PIM applications are not always integrated. For instance, some scheduling programs do not contain electronic mail features, but interface with whatever electronic mail program is provided, and vice versa. PIM solutions (whether it be a single application, a single integrated application or multiple interfaced applications) may be configured to support a wide variety of other features, such as task lists and personalized address books in project management, to name a few. Object store is a memory which is configured to store a plurality of individual records or objects, each comprising a plurality of fields or properties related to the inventive features. It should be recognized that applications may always be embedded in one another for ease of use without changing their functionality contemplated herein.

Once the login-interface system 116 determines that it has been included in a meeting invitation, a record is created to hold information related to the upcoming meeting.

It should be recognized that the login-interface system 116 and method illustrated in the figures operate in a computing environment including a plurality of user/client computing devices 104 (tablet, phone etc.) as described with respect to FIG. 1 and the login-interface system 116 is capable of executing different application types for platforms that the user/client computing devices 104a through 104n are accessing. The system architecture may use one or more backup servers; one or more cloud services; one or more web services, communicatively coupled to execute the functions described.

User information storage may include a library of user identification information such as users/clients that have accessed, or are permitted to access, the user device may contain the user information storage. User information storage may further include information about each user, (type of user, a picture of the user, a name, identification number, and other user-related information).

System storage (346a through 346n in FIG. 3) may include a system cache that can be persisted across users and reboots of the user-space, a "keybag" for a user that is currently logged in on the user/client device, synchronization manifests, a display screen image that is to be displayed during transition from a login interface as a system user to user home page interface when the user is logged in. The "keybag" may comprise a data structure that contains access keys for a user, wherein each access key provides access to one of: a user local storage, a backup server, one or more cloud services, or one or more web services etc.

When a user (U1—John Doe, U2—Jane Smith, or U3—Boy Cooper) logs in using user/client device 104a through 104n, login credentials may be authenticated and the one or more access keys may be generated from the login credentials. Login credentials may be stored locally or in cloud storage. Login credentials may be authenticated at the backup server, cloud services, or web service. The "keybag" of the current user may be stored in a system cache in system storage. The system cache may persist across reboots of user-space during a power sequence.

System storage (346a through 346n in FIG. 3) may also include a synchronization manifest for each of one or more users. In some instances, at the application layer in the overall architecture, a synchronization manifest for a user may include a list of synchronization tasks to be performed on behalf of a first user, while the user/client device 104a through 104n is being used by another user. A synchronization manifest may contain a synchronization task data structure for each item of data to be synchronized. A synchronization task may include a handle to a data structure to access the data to be synchronized, a handle to the application that generated the data to be synchronized, a "keybag" or pointer to a "keybag," that contains an access key to that enables access for that user to the service (e.g. backup server, cloud service, or web service) for each synchronization task, check-pointing information that indicates progress and current state of the synchronization task, scheduling information for scheduling the synchronization task with respect to other synchronization tasks in the synchronization manifest, and other information that facilitates completion of the synchronization task. There can be a synchronization manifest for each of users in system storage at a time. Synchronization manifests can be queued and scheduled according to scheduling logic, such as shortest task first, first-in-first-out, largest task first, data related to examinations first, and the like.

Figure 6:
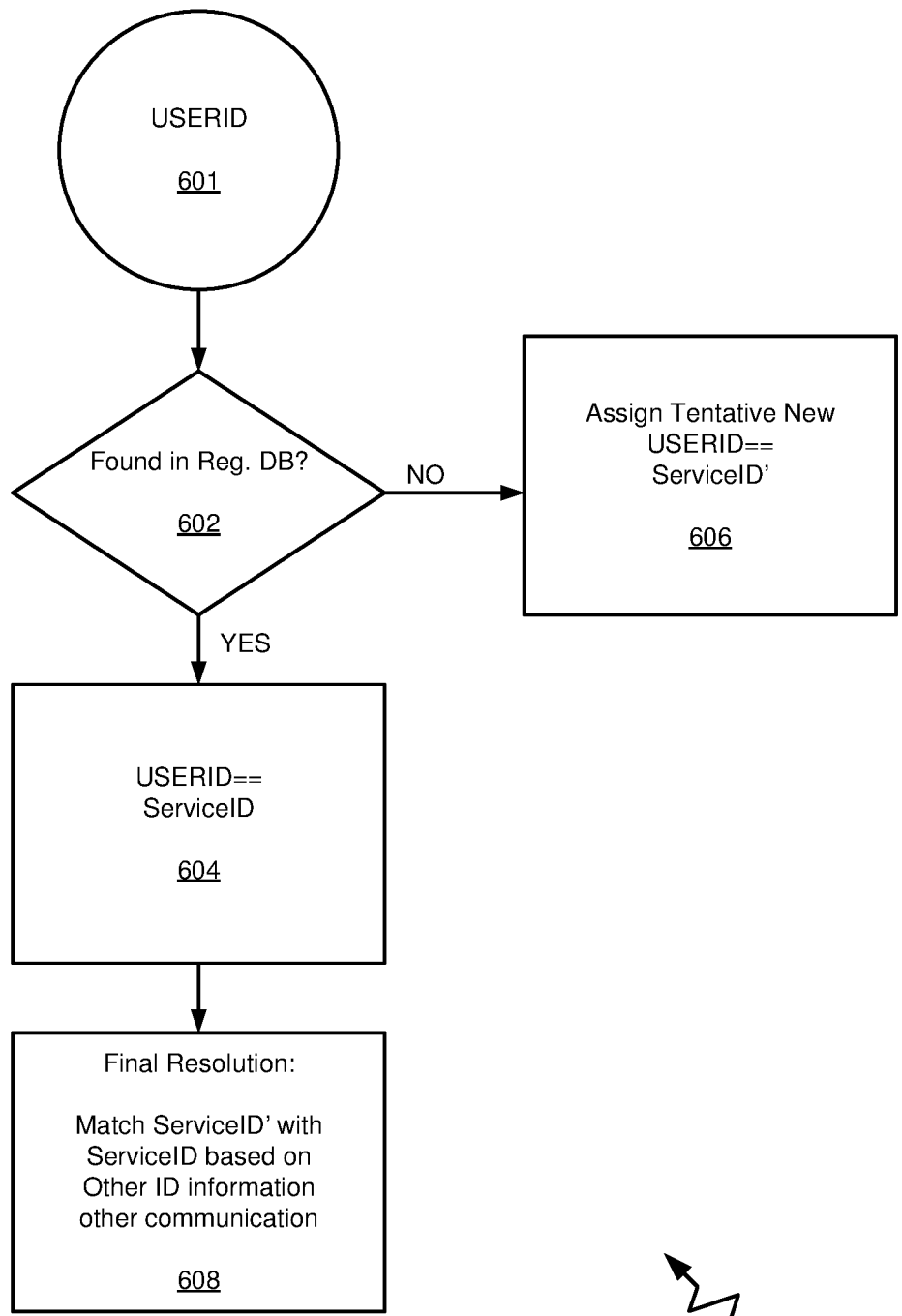
FIG. 6 is a flow chart of an enrollment process of the login-interface system in accordance with one embodiment of the present invention.

Referring now to FIG. 6, which describes an enrollment process 600 (e.g., for a virtual meeting scenario), a USERID (user identification) referenced by reference numeral 601, may be introduced, stored and found in the registration database (DB) 120. If the login-interface system 116 (FIG. 5) is able to locate a user it correlates a User identification (USERID) with the Service identification (ServiceID), as designated by reference numeral 604. If the login-interface system 116 (FIG. 5) is not able to make a correlation, it assigns a tentative new user identification (USERID') to the ServiceID, as designated by reference numeral 606. From block 604, the flow proceeds to block 608, where a final resolution is made by the reconciliation/resolution server 422 (FIG. 4). In this final resolution process, the collision-resolution engine 117 and inference engine 119 perform their functions as described above. This process matches the ServiceID' with the ServiceID based on other information and communications relating to identification that is found.

Figure 7:
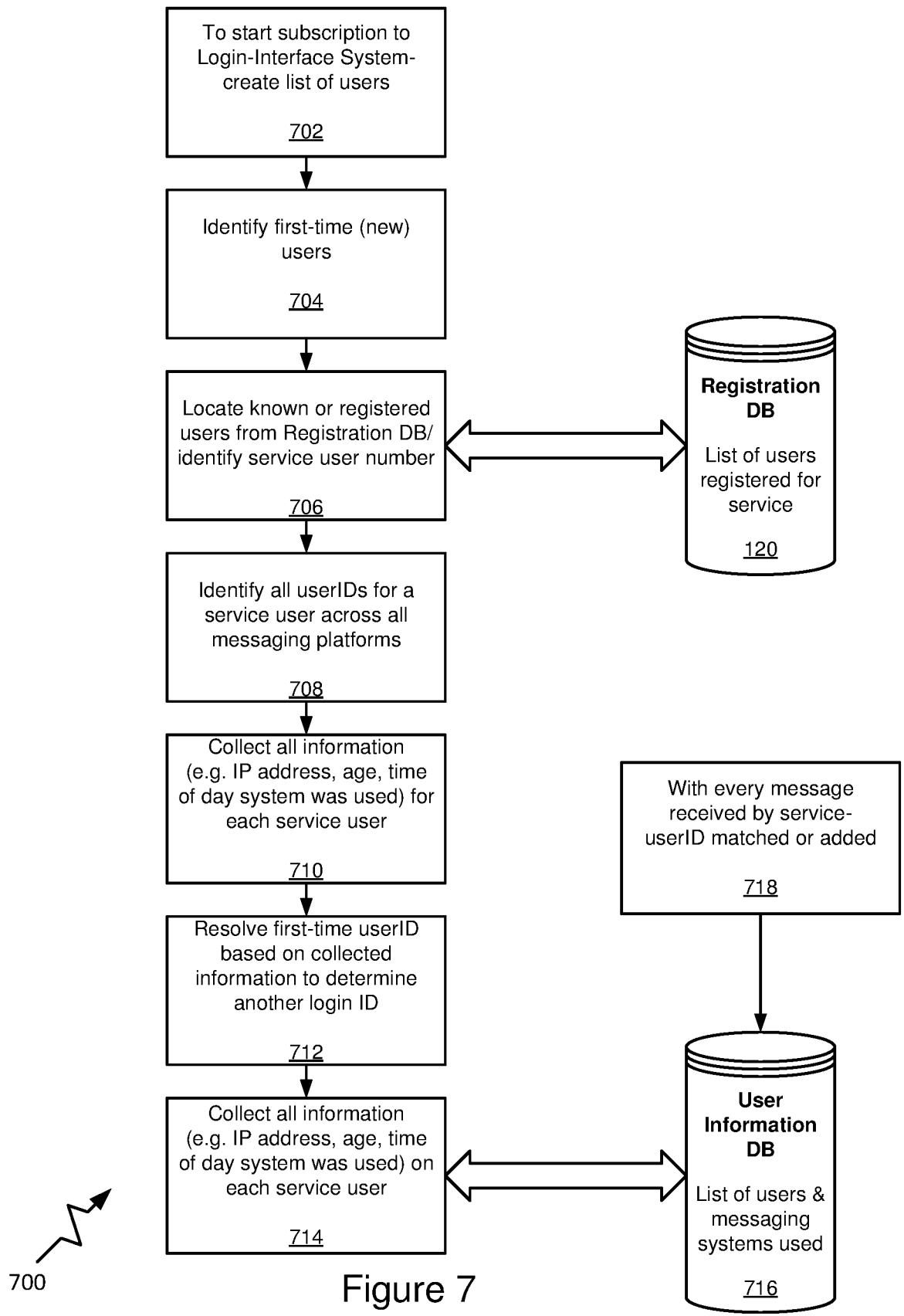
FIG. 7 is a flow chart illustrating a sign-up process to login-interface system in accordance with one embodiment of the present invention.

Referring now to FIG. 7, a login subscription or sign-up process 700 is described. The process 700 flow starts by creating a list of users (e.g., John Doe, Jane Smith etc.) at the start of the subscription program, designated by reference numeral 702. The process 700 flows to the next step 504, by which first-time or new users are identified. The process 700 flows to the next step 706, involving one or more operations for locating known or registered users from the registration database (DB) 120 or the like to identify a service user number. The process 700 flows to the next step 708, which includes one or more operations for identifying all userIDs for a server user across all messaging platforms. The process 700 flows to the next step 710, involving one or more operations for collecting all data from the login-interface system 116. The process 700 flows to the next step 712, including one or more operations, for resolving first-time userID based on collected information to determine another login ID. The process 700 continues to the next block of operations 714, including one or more operations for collecting information (e.g., IP address, age, time of day system was used) for each service user. The process 700 collects any information from a User Information Database (DB) 716, which has a list of users and messaging systems used by each user. These operations are illustrated by block 716. The information in the User Information DB 716 is accumulated with every message received by the Service User ID that is matched or added by the login-interface system 116.

System storage (used for the registration database 120 or user information database 716) can further include a system cache that stores information that can be persisted across users and user-space reboots, such as "keybags," synchronization manifests, a login screen to be displayed during a user-space reboot, or a logout screen that is displayed while logout processes are being completed and user-space is being rebooted.

User storage may include data storage, such as one or more containers, in which each may store their respective session data. In some embodiments, each user's data may be encrypted. In some embodiments, encryption may be based at least in part on a key generated at least in part using the user's passcode or other user credentials.

It should be recognized that user-space processes may include a launch daemon ("LD"). Launch daemon is an early boot task that can launch other daemons such as a user manager daemon, a user session manager or synchronization daemon. User-space processes may further include background processes and other processes within user-space. Other processes may include user applications, client/user interface, and login interface. Launch daemon may launch user manager daemon (UMD) as an early boot task. Functionality of user manager daemon may be exposed via user manager framework. Communications flow between the overall architecture framework and the application programming interface (API).

User manager daemon may access user information data stored to retrieve the identification of a user of a user/client device. The user/client information may be passed to, e.g., login interface or user interface to display user identification information while the client device logs in a user or logs out a user. User manager daemon may act as an arbiter, or traffic manager, that facilitates log in and log out of users. User manager daemon may launch, or cause to be launched, user session manager (USM). User manager daemon can determine whether the computing device is performing a boot (e.g., a hard power on boot or device restart) and determine that the client device should boot as the system user, to the login screen.

User session manager may present an appropriate user-specific user interface for display to each user or participant. For example, during a boot or reboot to a login screen, the USM may launch a login interface to obtain login credentials from a user. During a logout process, USM may present a logout message on the user interface that is specific to a particular user. In one instance, user interface displays a status of a logout process while a logout and user-space reboot are underway. User-space processes, such as USM, user applications, login user interface, and user interface may register with UMD to receive a notification that a "User Switch Request" has been made. A user switch request indicates that user-space processes are to begin saving application state, generating synchronization tasks for storage in a synchronization manifest, and begin shutting down. Each user-space process may notify UMD when the process is about to be shut down by sending UMD, a "Ready to Switch Users" notification. Shutting down an application may include determining application data that needs to be synchronized to, e.g., a cloud service and storing a synchronization task record in a synchronization manifest in system storage for retrieval after reboot of user-space to another user.

It should be recognized that background processes in the application layer of the overall architecture may include daemons, e.g., cloud daemon, cloud docs daemon, and web work daemon. Daemons can spawn processes, e.g., sync cloud storage, synch cloud docs, and synch web work, that perform work on behalf of a particular user. The synchronization manifest may contain one or more references to data to be backed up or synchronized to one or more backup servers, cloud services, or web services on behalf of the particular user. The work can be performed by the applicable daemon generating a process on behalf of the user specified in the synchronization manifest. Daemons and processes may each register with UMD to receive a "Switch User Requested" notification. A switch user request may be generated by UMD in response to UMD receiving a "User Logout Request." A User Logout Request may be generated in response to a user initiating a log out process, by a user pressing a power on reset button, or by kernel initiating a system shutdown, such as due to the system running out of resources. A Switch User request can also be generated in response to a system-wide user logout command issued by a third-party administrator, e.g., at the end of a session.

Figure 8:
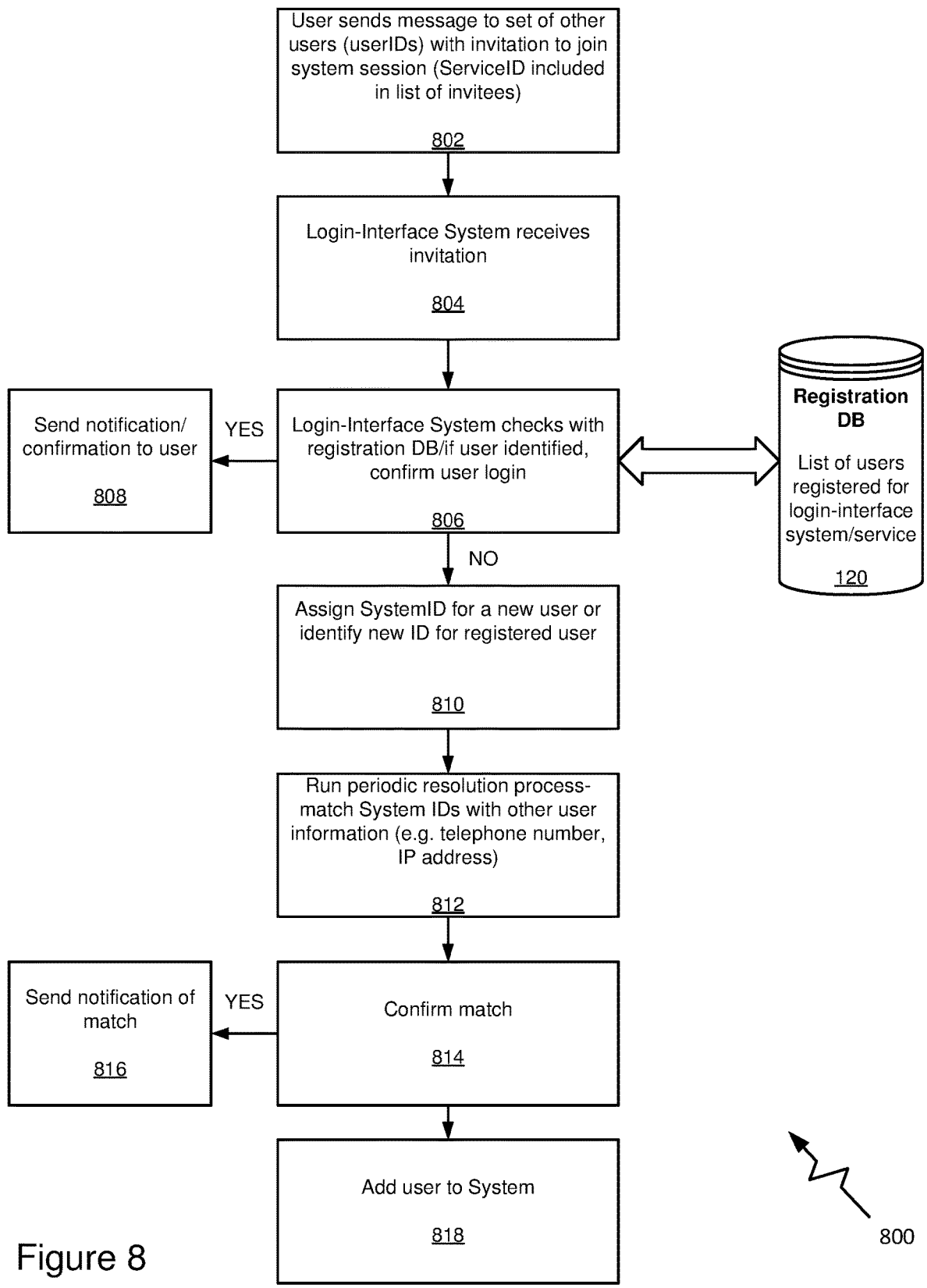
FIG. 8 is an illustration of an example login scenario in accordance with one embodiment of the present invention.

Referring now to FIG. 8, an example login scenario 800 is illustrated and described. The process flow 800 begins when a user sends a message M1 to other users, e.g., John Doe and others (UserIDs) with an invitation to join a system session (ServiceID included in the list of invitations). These operations are illustrated by block 802. The process flow 800 flows to the next block 804, which confirms that the login-interface system 116 received the invitation. The process 800 flows to the next block 806, including one or more operations, by which the login-interface system 116 checks with the registration database (DB) 120 if a user is identified to confirm the user login. The registration database (DB) 120 has a list of users (e.g., John Doe etc.) registered for the login-interface system 116. If the system check in block 806 leads to an affirmative answer, a notification or confirmation is sent to the user, as designated in block 808. If the system check in block 806 leads to a negative answer, the login-interface system 116 assigns a SystemID for a new user or identifies a new ID for a registered user. These operations are illustrated in block 810. The process flow 800 continues to the next step 812, in which the login-interface system 116 runs periodic resolution process match of SystemIDs with other user information, for example, telephone numbers, IP address or the like. The process flows to the next step 814, involving one or more operations for confirming a match. If the login-interface system 116 determines a match, it sends a notification of the match. This is illustrated in block 816. If the login-interface system 116 does not determine a match, it adds the user to the System's resources. These operations are illustrated in block 818.

It should be recognized that variations in the steps are accommodated by the login-interface system 116 and that the illustrations described here are by way of example.

As is known in the art, the computer in the sign-in interface is adapted to execute computer program modules for providing the functionalities described herein. As used herein, the term "module" refers to computer program logic utilized to provide a specified functionality. Thus, a module can be implemented in hardware, firmware, and/or software. In one embodiment, program modules are stored on the storage device, loaded into a memory, and executed by a processor.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to some possible embodiments. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein to create special-purpose computers, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method using an adaptive sign-in interface for tracking and automatically facilitating login for users of an application, the method comprising:
   identifying a first list of users in a messaging system;
   checking user identity for each user in the first list with a database to determine if each user is of record in the database;
   if the user is of record, automatically locating user identity credentials for each user and an associated service, in an event there is no record found, tagging the user as a provisional new user and assigning new user identity credentials to the provisional new user;
   performing at least one of a resolution action and a reconciliation action with other information found for the provisional new user to determine a status for the provisional new user, wherein the other information includes at least one of a real name, IP address and a telephone number, wherein the reconciliation action is performed by an inference engine configured to infer existence of presence of a single user when the single user participates as multiple participants in a session from different devices; and
   if the status for the provisional new user determines no prior record of user identity credentials, adding the provisional new user as a new user with the new user identity credentials to the database and using the new user identity credentials to sign in the new user to the application.

2. A computer-implemented method according to claim 1, wherein the resolution action is performed by a collision-resolution engine to ensure that each user in the first list of users in the database has unique identity credentials.

3. The computer-implemented method of claim 1, wherein the first list of users and associated user identity credentials in the database is dynamically and continuously updated by an identity-provider application, the identity-provider application providing an object to set up a meeting event or an electronic mail using a set of properties supported by a personal information manager.

4. The computer-implemented method of claim 1, wherein the adaptive sign-in interface identifies the users in the first list by use of a plurality of different applications, services, or systems, by each user in the first list, wherein the adaptive sign-in interface recognizes each instance of use of at least one of a new email address or a new phone number by an existing user in the first list and registers the new email address or new phone number in a user record in the database.

5. The computer-implemented method of claim 1, further comprising:
   identifying a plurality of user identity credentials for a user across a plurality of different messaging systems including email, text and telephone.

6. The computer-implemented method of claim 1, wherein all information for each user in the first list is collected and stored in a user information database, wherein the user information database has a list of users and a corresponding messaging system used by each user.

7. The computer-implemented method of claim 1, wherein if the status for the provisional new user determines a prior record of user identity credentials, resolving the user identity credentials and updating a record for an existing user.

8. The computer-implemented method of claim 1, wherein a notification is sent to the user when the user identity credentials are confirmed.

9. The computer-implemented method of claim 1, wherein a query notification is sent to the user to confirm user identity credentials in the event of uncertainty.

10. A non-transitory computer-readable storage medium storing instructions that when executed by a computer processor perform actions via an adaptive sign-in interface for tracking and automatically facilitating login for users of an application, comprising:
   identifying a first list of users in a messaging system;
   checking user identity for each user in the first list with a database to determine if each user is of record in the database;
   if the user is of record, automatically locating user identity credentials for each user and an associated service, in the event there is no record found, tagging the user as a provisional new user and assigning new user identity credentials to the provisional new user;
   performing at least one of resolution and reconciliation actions with other information found for the provisional new user to determine a status for the provisional new user, wherein the other information includes at least one of a real name, IP address and a telephone number, wherein the reconciliation action is performed by an inference engine configured to infer existence of a single user when the single user is participating as multiple participants in a session from difference devices; and
   if the status for the provisional new user determines no prior record of user identity credentials, adding the provisional new user as a new user with the new user identity credentials to the database and using the new user identity credentials to sign in the new user to the application.

11. The non-transitory computer-readable storage medium of claim 10, storing instructions that when executed by a computer processor perform actions further comprising:
   performing by a collision-resolution engine the resolution action to ensure that each user in the first list of users in the database has unique identity credentials.

12. The non-transitory computer-readable storage medium of claim 10, wherein the first list of users and user identity credentials in the database is dynamically and continuously updated by an identity-provider application, the identity-provider application providing an object to set up a meeting event or an electronic mail using a set of properties supported by a personal information manager.

13. The non-transitory computer-readable storage medium of claim 10, wherein the adaptive sign-in interface identifies the users in the first list by use of a plurality of different applications, services, or systems, by each user in the first list, wherein the adaptive sign-in interface recognizes each instance of use of at least one of a new email address or a new phone number by an existing user in the first list and registers the new email address or new phone number in a user record in the database.

14. The non-transitory computer-readable storage medium of claim 10, further comprising:
   identifying a plurality of user identity credentials for a user across a plurality of different messaging systems including email, text and telephone.

15. The non-transitory computer-readable storage medium of claim 10, wherein all information for each user in the first list is collected and stored in a user information database, wherein the user information database has a list of users and a corresponding messaging system used by each user.

16. The non-transitory computer-readable storage medium of claim 15, wherein if the status for the provisional new user determines a prior record of user identity credentials, resolving the user identity credentials and updating a record for an existing user.

17. The non-transitory computer-readable storage medium of claim 10, wherein a notification is sent to the user when the user identity is confirmed.

18. The non-transitory computer-readable storage medium of claim 10, wherein a query notification is sent to the user to confirm user identity credentials in the event of uncertainty.

19. A system, comprising:
   a processor;
   a memory storing instructions that cause the processor to execute actions;
   an adaptive sign-in interface for tracking and automatically facilitating login for users into a plurality of different applications, wherein the processor executes actions via the adaptive sign-in interface, to:
   identify a first list of users in a messaging system;
   check user identity for each user in the first list with a database to determine if each user is of record in the database, wherein all information for each user in the first list is collected from a plurality of different messaging systems and stored in a user information database, wherein the user information database has a list of users and a corresponding messaging system used by each user;
   if the user is of record, automatically locate user identity credentials for each user and an associated service, in an event there is no record found, tag the user as a provisional new user and assign new user identity credentials to the provisional new use and wherein if a status for the provisional new user determines a prior record of user identity credentials, resolve the user identity credentials and update a record for an existing user;
   perform at least one of resolution and reconciliation actions with other information found for the provisional new user to determine a status for the provisional new user, wherein the other information includes a real name, an IP address, and a telephone number, wherein the reconciliation action determines existence of a single user when the single user is participating as multiple participants from different devices in a single session;
   if the status for the provisional new user determines no prior record of user identity credentials, add the provisional new user as a new user with the new user identity credentials to the database and use the new user identity credentials to sign in the new user to the application; and
   send a notification to the new user when the new user identity credentials are added to the database.

20. The system according to claim 19, wherein the processor executes actions via the adaptive sign-in interface, to:
   identify a plurality of user identity credentials for a user across a plurality of different messaging systems including email, text and telephone.

* * * * *